(12) United States Patent
Baalu et al.

(10) Patent No.: US 10,205,770 B2
(45) Date of Patent: Feb. 12, 2019

(54) MOBILE DEVICE APPLICATION INTEGRATION WITH INFOTAINMENT HEAD UNITS

(71) Applicant: HARMAN INTERNATIONAL INDUSTRIES, INC., Stamford, CT (US)

(72) Inventors: Arvin Baalu, Bangalore (IN); Manu Malhotra, Bangalore (IN); Sangeetha Venkateswaran, Bangalore (IN); Omprakash Meena, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 930 days.

(21) Appl. No.: 14/327,399

(22) PCT Filed: Jan. 8, 2013

(86) PCT No.: PCT/US2013/020676
§ 371 (c)(1),
(2) Date: Jul. 9, 2014

(87) PCT Pub. No.: WO2013/106329
PCT Pub. Date: Jul. 18, 2013

(65) Prior Publication Data
US 2015/0334171 A1    Nov. 19, 2015

(30) Foreign Application Priority Data

Jan. 9, 2012   (IN) .............................. 79/MUM/2012

(51) Int. Cl.
*G06F 15/173* (2006.01)
*H04L 29/08* (2006.01)
(Continued)

(52) U.S. Cl.
CPC .............. *H04L 67/10* (2013.01); *B60K 35/00* (2013.01); *B60K 37/06* (2013.01);
(Continued)

(58) Field of Classification Search
CPC ................................ H04L 67/12; H04L 29/06
(Continued)

(56) References Cited

U.S. PATENT DOCUMENTS

2005/0104858 A1*  5/2005  Need ........................ G06F 9/451
                                                          345/172
2007/0015486 A1*  1/2007  Marlowe .............. G11B 19/025
                                                          455/345
(Continued)

FOREIGN PATENT DOCUMENTS

CN          102216731 A        10/2011
CN          102323883 A    *   1/2012
(Continued)

OTHER PUBLICATIONS (Sai Geetha's Blog—Android, Blogger.com, Geetha, Sai. M.N. (Public Availability date: Apr. 4, 2010), Remote Service, Android Developer Tutorial (Part 9), Public Availability as retrieved from: https://web.archive.org/web/20100404051715/http://saigeethamn.blogspot.com/2009/09/android-developer-tutorial-part-9.html).*

(Continued)

*Primary Examiner* — Kevin T Bates
*Assistant Examiner* — Emad Siddiqi
(74) *Attorney, Agent, or Firm* — Artegis Law Group, LLP (57) ABSTRACT

A system is provided for integrating a feature rich application platform operating on a mobile device with a vehicle infotainment system. The system includes a head unit configured to control user interface devices including a display, a command entry device, and an audio output device. The head unit also includes computing resources and a commu- (Continued)

nications interface. A content consumer application operates using the computing resources of the head unit, and is configured to communicate user generated commands over a communications interface to a content provider application executing on a mobile device. The content provider application is configured to direct the user generated commands to one of a plurality of sub-applications on the mobile device.

24 Claims, 6 Drawing Sheets (51) Int. Cl.
  *H04L 29/06* (2006.01)
  *G01C 21/36* (2006.01)
  *B60K 35/00* (2006.01)
  *B60K 37/06* (2006.01)
  *G06F 9/451* (2018.01)
  *H04M 1/60* (2006.01)
(52) U.S. Cl.
  CPC ......... *G01C 21/3664* (2013.01); *G06F 9/451* (2018.02); *H04L 67/12* (2013.01); *H04L 67/42* (2013.01); *B60K 2350/355* (2013.01); *B60K 2350/357* (2013.01); *G01C 21/3629* (2013.01); *H04M 1/6091* (2013.01)
(58) Field of Classification Search
  USPC ......................................................... 709/203
  See application file for complete search history.

(56) References Cited

U.S. PATENT DOCUMENTS

| 2008/0248742 | A1 | 10/2008 | Bauer et al. |
| 2009/0174537 | A1* | 7/2009 | Rovik ................... B60K 35/00 340/438 |
| 2010/0037057 | A1* | 2/2010 | Shim ................... H04L 63/0823 713/171 |
| 2011/0093136 | A1* | 4/2011 | Moinzadeh ............ B60R 25/00 701/2 |
| 2012/0192109 | A1* | 7/2012 | Stolle ................... G06F 9/4443 715/810 |

FOREIGN PATENT DOCUMENTS

| DE | 102009059141 A1 | 4/2011 |
| EP | 1885107 A1 | 2/2008 |
| WO | 2008/043059 A1 | 4/2008 |

OTHER PUBLICATIONS

Sai Geetha's Blog—Android, Blogger.com, Geetha, Sai. M.N. (Apr. 4, 2010), Remote Service, Android Developer Tutorial (Part 9), Public Availability as retrieved from: https://web.archive.org/web/20100404051715/http://saigeethamn.blogspot.com/2009/09/android-developer-tutorial-part-9.htm (Year: 2010).*

International Search Report for PCT/US2013/020676, dated May 2, 2013.

* cited by examiner

MOBILE DEVICE APPLICATION INTEGRATION WITH INFOTAINMENT HEAD UNITS

PRIORITY CLAIM

This application claims the benefit of priority from India Patent Registration Application No. 79/MUM/2012 dated Jan. 9, 2012, which is incorporated by reference.

BACKGROUND OF THE INVENTION

1. Field of the Invention

This invention relates generally to vehicle infotainment systems, and more particularly, to systems and methods using applications on mobile devices in infotainment systems.

2. Related Art

Computing resources have been used in vehicles for functions such as, for example, vehicle control, information retrieval and display to the driver, entertainment (for example, audio systems), and navigation assistance. Vehicle control functions are typically handled by a dedicated real-time processing system. Information retrieval functions include interfaces to sensors such as velocity sensors, temperature sensors, location sensors, and any other type of physical state sensor. Information retrieval functions may also include functions that retrieve traffic reports or other type of data, and functions that communicate the data and information from the sensors to the driver or to other sub-systems (for example, the navigation assistance sub-system). The messages may be displayed or audibly annunciated. Navigation assistance functions may include route generating functions and map generating functions with reporting functions that may provide audible real-time guidance, or images of route maps on a video screen. Audio/video sub-systems include a radio receiver, a CD player, a DVD player, or an interface to external devices such as MP3 players. Systems that provide information, entertainment and navigation assistance are often embodied as "infotainment systems" having integrated or shared computing and hardware resources.

In an infotainment system, the information, entertainment, and navigation functions are performed by sub-systems having hardware and/or software configured for the corresponding functions. The sub-systems connect to a head unit, which includes computing resources, input/output interfaces, and hardware and software functions for managing the computing and input/output resources. The head unit allows the sub-systems to share resources that may be needed by more than one sub-system. For example, an infotainment system may include an audio/video sub-system, a navigation assistance sub-system, and an information retrieval sub-system, and all of the sub-systems may have functions that require the use of audio speakers, or a video display. Rather than having each sub-system use dedicated audio speakers or video displays, the head unit is used to manage access to a common set of audio speakers or video display by all three sub-systems.

Infotainment systems are becoming increasingly sophisticated as the number of applications and features that may be implemented continues to grow. As features and applications (or even new types of sub-systems) are added to infotainment systems, higher performance computing resources may be needed to enable satisfactory operation. Faster processors may be needed. More or different types of memory may be needed. Enhancements to the features provided by infotainment systems evolve naturally, but their implementation may result in increased costs to manufacture. In addition, the enhancements or upgrades are typically designed into the system. That is, the opportunity to add new features or applications after manufacture is either limited or non-existent. Even if software versions may be upgraded using an external port connected to flash memory, the head unit resources may not permit much feature expansion.

The increased costs that result from evolving enhancements to infotainment systems may be alleviated somewhat by providing systems with different levels of feature content that may correspond with different classes of vehicles. Infotainment systems may also be provided as user configurable extras where systems having different levels of feature content are priced accordingly. For example, an entry level system having a base level of performance capability may be provided as standard equipment, and systems with more features or higher performance capabilities may be offered at added costs as buyer selectable options.

Limitations remain with the solution involving infotainment systems at different classes with different levels of performance. The entry level infotainment system for example may not have sufficient resources to allow for upgrading. Maintenance of multiple versions of software also becomes more complicated, which adds costs. There is a need for a way of enhancing features in infotainment systems that does not result in increasing costs.

SUMMARY

In view of the above, A system is provided for integrating a feature rich application platform operating on a mobile device with a vehicle infotainment system. The system includes a head unit configured to control user interface devices including a display, a command entry device, and an audio output device. The head unit also includes computing resources and a communications interface. A content consumer application operates using the computing resources of the head unit, and is configured to communicate user generated commands over a communications interface to a content provider application executing on a mobile device. The content provider application is configured to direct the user generated commands to one of a plurality of sub-applications on the mobile device.

In another example, the content consumer application is configured to receive messages from the sub-application via the content provider application, and to generate the message to the user using one of the user interface devices.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of example embodiments, reference is made to the accompanying drawings that form a part of the description, and which show, by way of illustration, specific example embodiments in which the invention may be practiced. Other embodiments may be utilized and structural changes may be made without departing from the scope of the invention.

Figure 1:
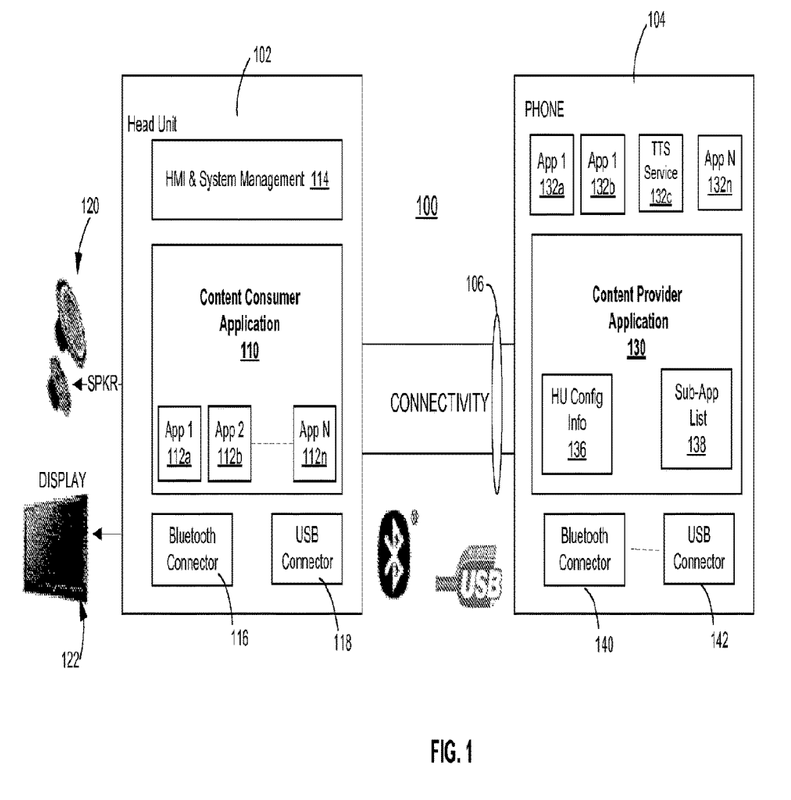
FIG. 1 is a schematic diagram of an example system for integrating a mobile device with an infotainment system.

FIG. 1 is a schematic diagram of an example system 100 for integrating a mobile device with an infotainment system. The system 100 in FIG. 1 includes a head unit 102 to control resources for an infotainment system in a vehicle. The head unit 102 communicates with a mobile device 104 via a communications interface 106. The head unit 102 includes an interface for communicating audio signals to a speaker system 120 and for communicating video signals to a display 122. The head unit 102 in FIG. 1 includes functions typically found in head units, such as a human machine interface ("HMI") and system management 114. The HMI and system management functions 114 include functions for receiving user input and displaying user messages to user interface devices (not shown). For example, the user interface devices may include an LCD or LED display, which may be touch panel that implements soft buttons via displayed icons. In an example implementation, a monochrome 4-line display is implemented as display 122. The user interface devices may also include hardware buttons, dials, slide levers, and any other type of user interface device that may be used to communicate with an infotainment system. In an example implementation, at least a select button and a pair of scroll buttons may be provided as user input devices for the head unit 102.

The HMI and system management functions 114 may also include functions for managing the sharing of computing and I/O resources, such as the speaker system 120 and display 122, between functional units such as an audio/video sub-system, navigation assistance sub-system to the extent such sub-systems are included. For purposes of this description, the head unit 102 is assumed to be of an entry level class having processing power and memory capacities on the lower end of what is typically available for head units. An example entry level head unit 102 may be equipped with about 512 kb of program memory and 64 kb of data memory. In this description, no functional sub-systems are assumed to be connected for operation with the head unit 102. Any function that may otherwise be implemented via a separate sub-system is assumed here to be available as an application on the mobile device 104. It is noted that an entry level head unit 102 is assumed in descriptions of example implementations below to illustrate the capability of the system 100 to provide a variety of features and applications with limited processing capabilities, and not to limit the invention in any way.

The head unit 102 in FIG. 1 further includes a content consumer application 110, which communicates with the mobile device 104 to provide the resources of the head unit 102 during operation of the features and applications on the mobile device 104. Applications that operate on the mobile device 104 may use the user interface devices, such as the speaker system 120, the display 122, and buttons managed by the head unit 102. The mobile device 104 may thus become a feature rich platform that makes virtually any number of applications available to the head unit 102, which effectively operates as a display proxy, or a speaker proxy, or a proxy for whatever resource controlled by the head unit 102 is used by the applications on the mobile device 104. Although the head unit 102 may have an entry level capacity, the feature rich platform provided by the mobile device 104 allows the head unit 102 to perform at a high level limited mostly by the capacity of the mobile device 104.

In example implementations of the system 100 in FIG. 1, the content consumer application 110 may be a proxy thin client that communicates for resources from a proxy server on the mobile device 104. An example implementation of the content consumer application 110 as a proxy thin client is described in more detail below with reference to FIG. 2.

The communication interface 106 may be implemented via a Bluetooth® connector 116 or a USB connector 118, or both. The communications interface 106 may also operate with the Bluetooth® Serial Port Profile ("Bluetooth® SPP") for command and control of mobile applications on the mobile device 104. A Bluetooth® Advanced Audio Distribution Profile ("A2DP") link may be established with the mobile device 104 to allow for Short Message System ("SMS") readout, Text-to-Speech ("TTS"), and navigation directions. It is noted that Bluetooth®, USB, Bluetooth® SPP, and A2DP are standard components accessible to those of ordinary skill in the art, and therefore, require no detailed description. The communications interface 106 may also be implemented using any other suitable standard, or using a proprietary interface.

The communications interface 106 provides a connection to the mobile device 104, which is described here as being a smartphone 104 for purposes of illustrating an example. The mobile device 104 may also be a tablet computer, a laptop, a handheld computer, or any other suitable portable computing device. The smartphone 104 in FIG. 1 and mobile devices described with reference to FIGS. 2-6 operates as an Android 2.1/2.2 platform. The smartphone 104 may be configured to operate applications such as SMS (or other text messaging or instant messaging applications), navigation applications, Internet browsing, Internet radio, GPS locator applications, or any other application that may be advantageously used in an infotainment system. The applications on the smartphone 104 are depicted in FIG. 1 as App1 132a, App2 132b, text-to-speech ("TTS") service 132c, and App N 132n.

The smartphone 104 in FIG. 1 operates as a feature-rich infotainment system application platform using a content provider application 130 that may be installed on the smartphone 104 as would any other smartphone application. The content provider application 130 may connect to the content consumer application 110 on the head unit 102. The connection may be made over the communication interface 106 connected to the smartphone 104 at a Bluetooth® connector 140 and/or a USB connector 142 on the smartphone 104. The connection may be established to enable the exchange of messages having commands for selecting and controlling the applications operating on the smartphone 104. The content provider application 130 may obtain a head unit configuration profile 136 via an initialization or setup process when connected to the content consumer application 110. The head unit configuration profile 136 may include information relating to hardware and software characteristics of the head unit 102. Such information may be used by the content provider application 130 to configure messages requesting use of resources on the head unit 102. For example, the head unit configuration profile 136 may include information relating to the display such as the number of lines and columns, and whether it's a color display or monochrome. The content provider application 130 in FIG. 1 also includes an application list 138 that may be compiled as described below with reference to FIG. 2 as the content provider application 130 starts up.

In an example implementation, the content provider application 130 on the smartphone 104 is implemented by configuring a Bluetooth® SPP proxy server for the content consumer application 110 implemented as a Bluetooth® SPP proxy client application. The use of a Bluetooth® SPP proxy client/server connected by a Bluetooth® SPP link at communications interface 106 provides a standard infrastructure for exchanging commands and control messages between the content consumer application 110 and content provider application 110. In addition, the use of Bluetooth® A2DP provides a standard mechanism for implementing audio features available on the smartphone 104 on the head unit 102.

Figure 2:
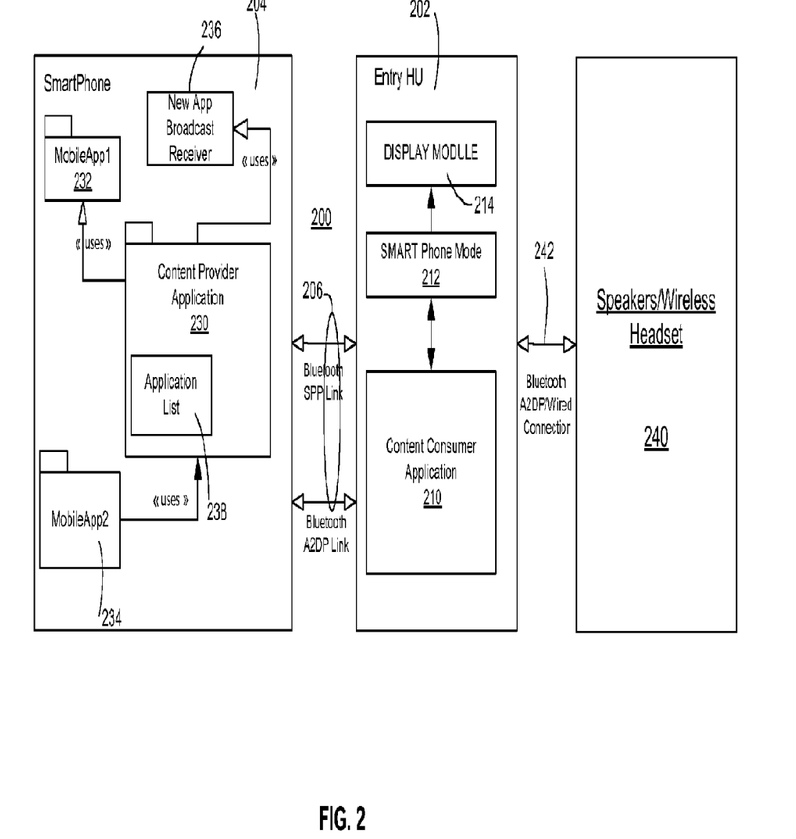
FIG. 2 is a block diagram illustrating operation of an example system for integrating a mobile device with an infotainment system.

FIG. 2 is a block diagram illustrating operation of an example system 200 for integrating a mobile device with an infotainment system. The system 200 may be similar to the system 100 described with reference to FIG. 1. The system 200 includes a head unit 202, a smartphone 204, and a speakers/wireless headset unit 240. The head unit 202 includes a smartphone mode enabling component 214, a display module 214, and a content consumer application 210. The head unit 202 may be connected to the speakers/wireless headset unit 240 via an audio interface 242, which may be implemented in an example using Bluetooth® A2DP or a wired connection. The system 200 in FIG. 2 includes a communications interface 206 for connecting to the smartphone 204. The communications interface 206 may be implemented as shown in FIG. 2 using a Bluetooth® SPP link and may also include a Bluetooth® A2DP link.

The smartphone 204 in FIG. 2 operates as an Android 2.1/2.2 platform. Operation of the components of the system 200 in FIG. 2 is described in the context of the Android system and as such makes reference to Android constructs or components. For example, a "broadcast receiver" is a component that provides a generalized mechanism for asynchronous event notifications. During operation, an application may encounter a condition or an event that should be communicated. The broadcast receiver may be configured to detect the condition and to subsequently communicate it. "Activity" components interface with the user via the display, touchscreen or keypad. An application's Activity leaves focus when another application is made active and the user interface changes to enable the new application's Activity. A "service" is a component that provides background processing for use when an application's Activities leave focus. It is noted that while "broadcast receivers," "Activities," and "services" are Android specific components, those of ordinary skill in the art would understand that other mobile device operating systems have similar components or constructs.

The smartphone 204 includes a content provider application 230, which identifies sub-applications that may operate on the smartphone 204 under the control of the head unit 202. The content provider application 230 also establishes and maintains a connection to the head unit 202 for exchanging commands and responses. The smartphone 204 may store the sub-applications, which are depicted in FIG. 2 as Mobileapp1 232 and MobileApp2 234. The content provider application 230 may identify the sub-applications and maintain an application list 238. New sub-applications may be added to the smartphone 204 at any time, even while the smartphone 204 is running the content provider application 230. A new application broadcast receiver 236 is included to monitor the installation of new applications, and to identify new applications that may be sub-applications that should be added to the application list 238.

The system 200 may begin operation when the smartphone 204 is connected to the head unit 202 using the communications interface 206. The head unit 202 may be in a smartphone mode as indicated by the smartphone mode enabling component 214. The head unit 202 may enter the smartphone mode based on user selection via an input command, or by sensing the connection of the smartphone to the head unit 202.

When the consumer provider application 230 is started up on the smartphone 204, the consumer provider application 230 searches the applications on the smartphone 204 and filters out the sub-applications, which are intended to operate while controlled by the head unit 202. The process of filtering the sub-applications may entail checking the names of all of the applications on the smartphone 204 and selecting applications having names that correspond to a signature pattern. For example, the name "com.vehicle.sms" may be used to identify the SMS application used with the head unit 202. Similarly, the name "com.vehicle.nav" may be used to identify a navigation application. As each sub-application is identified and filtered out, the names are added to the application list 238.

As noted above, a new application may be installed at any time, even if the content provider application 230 is up and running. The new app broadcast receiver 236 may monitor all new installations of applications and check the application name to determine if it should be added to the application list 238.

As the content provider application 230 is starting up, the content provider application 230 establishes and maintains the connection to the head unit 202. Once the content provider application 230 is up and running, the content provider application 230 waits for user input messages from the content consumer application 210. The messages may indicate that the user has selected a sub-application to run, or navigation through a list of applications available. FIGS. 3-6 illustrate the communication of messages between the content consumer application 210 and the content provider application 230.

Figure 3:
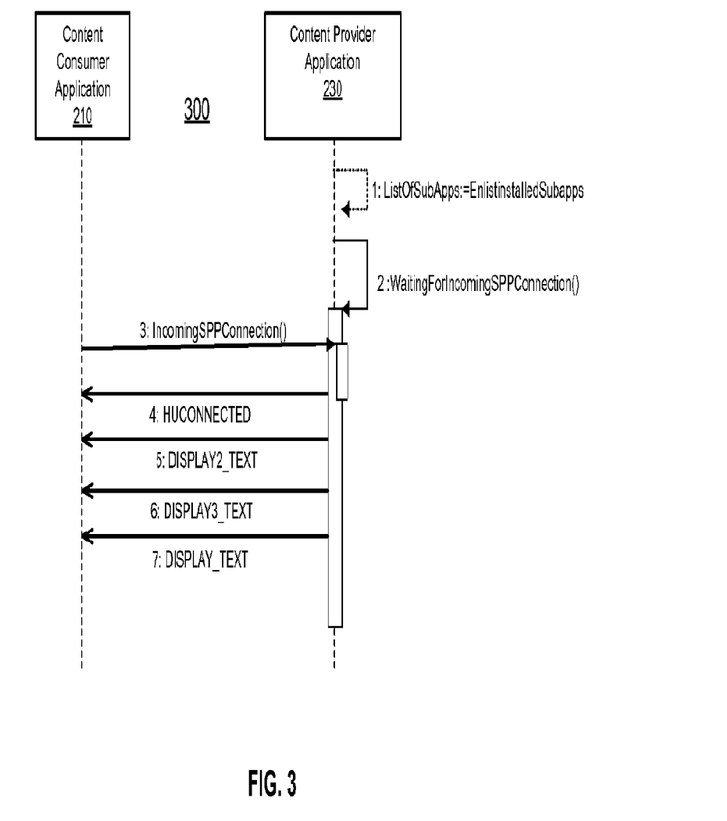
FIG. 3 is a message flow diagram illustrating communication between the content provider application and the content consumer application in FIG. 2 during initialization of the content provider application.

FIG. 3 is a message flow diagram illustrating communication between the content provider application 230 and the content consumer application 210 in FIG. 2 during initialization of the content provider application 230. The content provider application 230 is shown in FIG. 3 starting up. At event 1, the content provider application 230 is compiling the list of sub-applications. When the list is complete, the content provider application 230 waits for the SPP connection to be established with the content consumer application 210 as shown at event 2. At event 3, a message for establishing an incoming SPP connection is received at the content provider application 230 over the communications interface 206 in FIG. 2. At event 4, the content provider application 230 may communicate a response message (for example, "HUCONNECTED") acknowledging that the connection with the head unit is complete. At events 5, 6, and 7, the content provider application 230 may send messages indicating text that is to be displayed at indicated lines on the display.

After event 7, the content provider application 230 may wait for requests from the content consumer application 210 (the client side). The content provider application 230 may also send back a list of available sub-applications to the content consumer application 210. The list of sub-applications may correspond to places on the display that configured to allow the user to select a sub-application by identifying the name of the application on the display. The content provider application 230 may begin to receive request from the content consumer application 210 in the form of "NEXT" or "PREVIOUS" requests, which may be communicated in response to a user's press of a corresponding "NEXT" or "PREVIOUS" button. As the user presses the "NEXT" or "PREVIOUS" buttons, the selection of the sub-application on the list is moved up or down accordingly.

Figure 4:
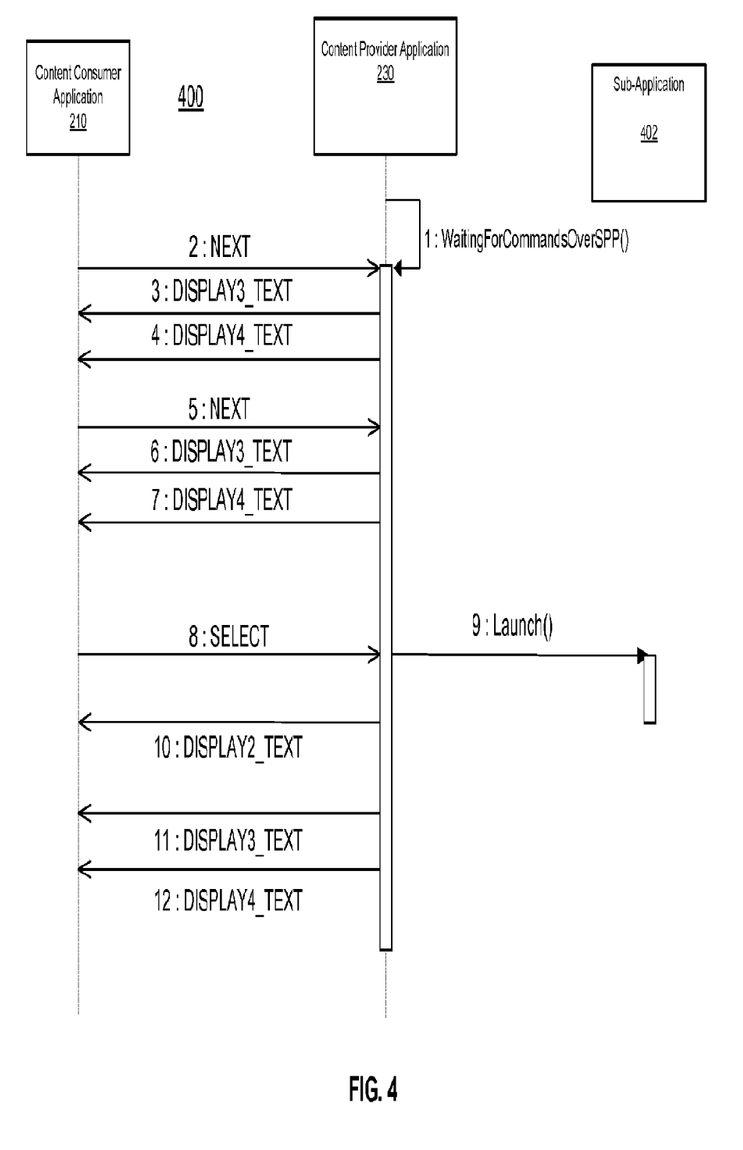
FIG. 4 is a message flow diagram illustrating communication of user commands from the content consumer application to the content provider application during initialization of a sub-application.

FIG. 4 is a message flow diagram illustrating communication of user commands from the content consumer application 210 to the content provider application 230 during initialization of a sub-application 402. As shown in FIG. 4, the content provider application 230 waits for commands over the SPP connection at event 1. At event 2, the content provider application 230 receives a "NEXT" command from the content consumer application 210. The "NEXT" command corresponds to the press of a "NEXT" button by the user. The content provider application 230 sends messages at events 3 and 4, which contain text to be displayed at indicated lines on the display. In response to the "NEXT" command, the content provider application 230 moves to the next sub-application on the list of applications. At event 5, the content provider application 230 receives another "NEXT" message from the content consumer application 210. The display is updated accordingly at events 6 and 7 while the content provider application 230 moves to designate the next sub-application in the application list as the selected application.

At event 8, the content consumer application 210 communicates a "SELECT" message indicating that the user has pressed a button, or otherwise actuated a user interface device indicating a selection of the currently selected sub-application on the list. In response, the content provider application 230 launches sub-application 402 at event 9. At events 10, 11, and 12, the content provider application 230 sends display text messages to display a message indicating selection of a sub-application 402.

When the sub-application is launched, a service is started to allow the content provider application 230 to forward requests from the content consumer application 210 to the sub-application 402. Each time the content provider application 230 launches a sub-application 402, it binds to a service started by the sub-application 402. Binding to the service of the currently open sub-application 402 allows the content provider application 230 to ensure that commands from the content consumer application 210 reach the correct sub-application 402. In order to send asynchronous data/responses back to the content consumer application 210, the sub-application 402 may use a custom broadcast receiver. The custom broadcast receiver is used to receive a system wide message with data meant for updating the display that was initiated by the sub-application. The content provider application 230 is registered with the same custom broadcast receiver allowing it to forward messages from the sub-application 402 to the content consumer application 210.

Figure 5:
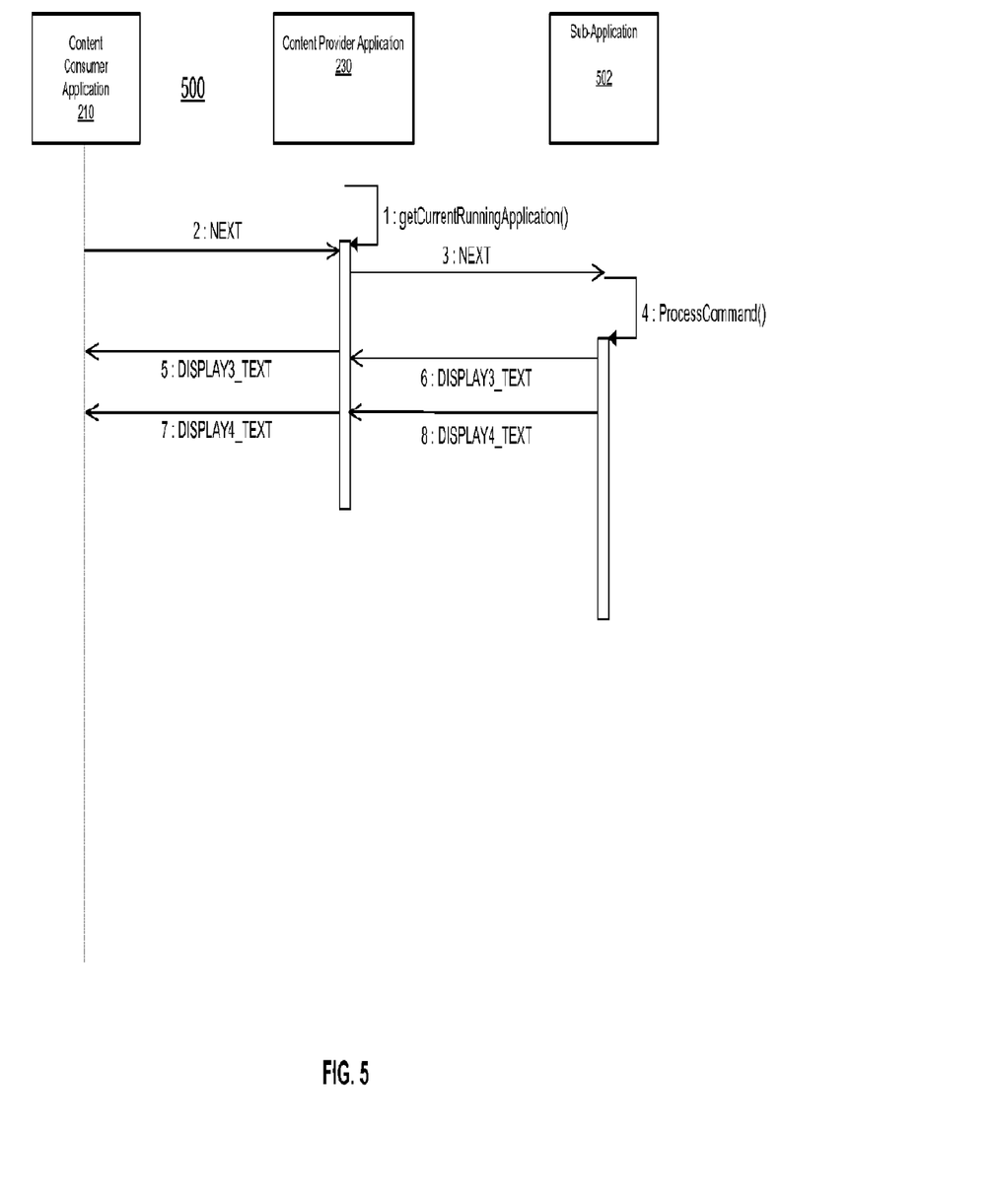
FIG. 5 is a message flow diagram illustrating communication of user commands from the content consumer application to the sub-application via the content provider application.

FIG. 5 is a message flow diagram illustrating communication of user commands from the content consumer application 210 to a sub-application 502 via the content provider application 230. At event 1, the content provider application 230 has launched a sub-application 502. The sub-application 502 now becomes the currently running application. At event 2, a "NEXT" command is sent from the content consumer application 210. The content provider application 230 delivers any command from the content consumer application 210 to the currently running application, which in FIG. 5 is sub-application 502. At event 3, the content provider application passes the "NEXT" command to the sub-application 502. The sub-application 502 processes the command at event 4. At events 5, 6, 7 and 8, messages may optionally be sent, first to the content provider application 230 and then to the content consumer application 210, to display selected text messages at selected lines.

As long as sub-application 502 is the currently running application, the content provider application 230 will pass commands that reflect user input at the head unit to the sub-application 502. The content provider application 230 binds with the service corresponding to the sub-application 502 and registers with the custom broadcast receiver of the sub-application 502 to ensure that messages from the sub-application 502 are delivered to the content consumer application 210. Once another application becomes the currently running application, the content provider application 230 binds to the service corresponding to the new sub-application and registers with the custom broadcast receiver of the new sub-application.

Figure 6:
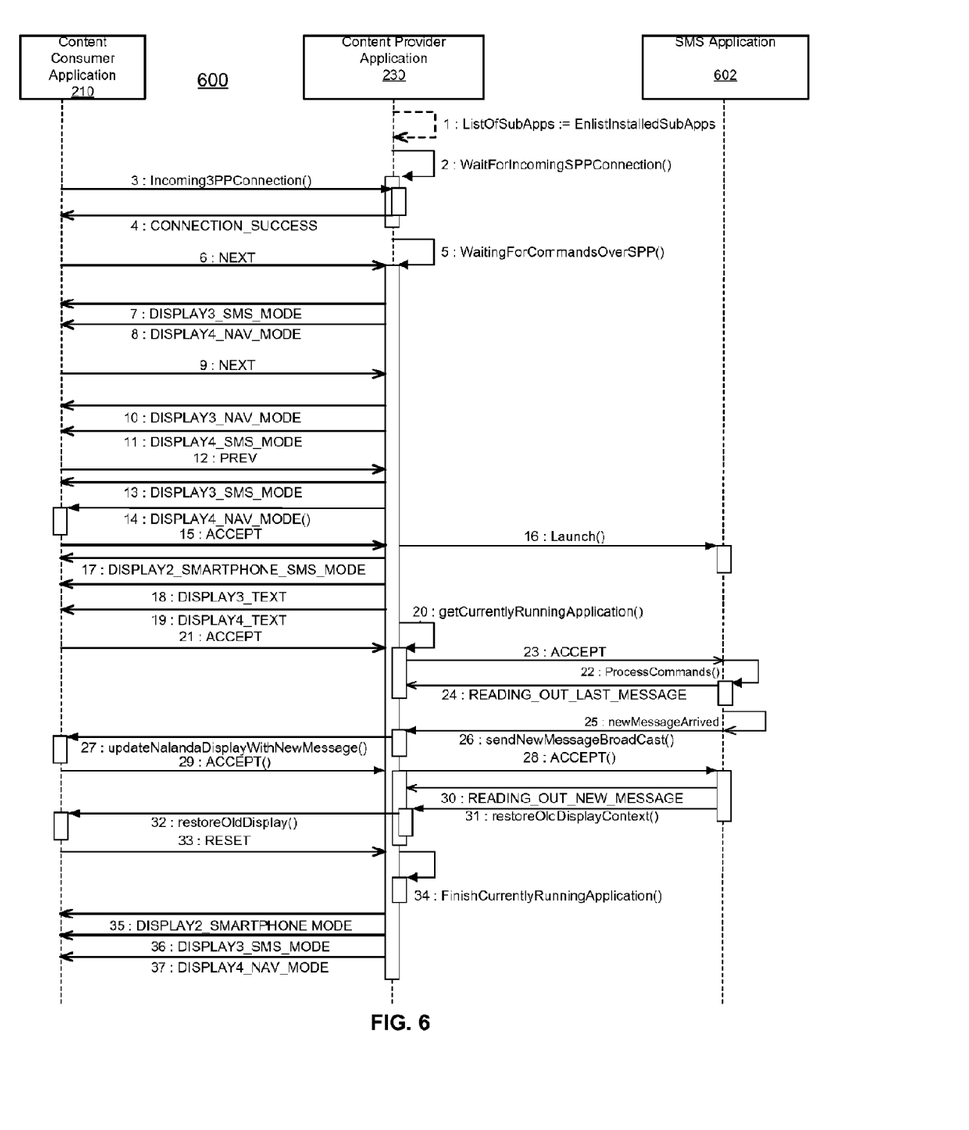
FIG. 6 is a message flow diagram illustrating the use of a short-message system (SMS) application operating on a smartphone by a head unit of an infotainment system.

FIG. 6 is a message flow diagram illustrating the use of a short-message system (SMS) application 602 operating on a smartphone by a head unit of an infotainment system. At event 1, the content provider application 230 is starting up and compiling the list of available sub-applications. At event 2, the content provider application 230 waits for an incoming SPP connection from the content consumer application 210. At event 3, the content provider application receives an incoming SPP connection request. The content provider application 230 sends back a message to the content consumer application 210 to acknowledge that the SPP connection was successfully established.

At event 5, the content provider application 230 waits for commands to be communicated over the SPP connection. At event 6, a "NEXT" command is sent to the content provider application 230. The content provider application 230 responds with text messages that display sub-application titles for an SMS application and a NAV application at events 7 and 8. At event 9, the content provider application 230 receives a "NEXT" command from the content consumer application 210. The content provider application 230 responds by sending display messages that switch the lines on which the titles to the SMS and NAV applications are displayed at events 10 and 11. At event 12, the content consumer application 210 sends a "PREV" command, and at events 13 and 14, the lines on which the titles of the SMS and NAV sub-applications are again switched. At this point, the title of the SMS application places the SMS application as next to be selected if the "SELECT" command is sent. At event 15, the "SELECT" or "ACCEPT" command is sent to the content provider application 230. The receipt of the "SELECT" command results in the content provider application 230 sending a "LAUNCH" command to the SMS application at event 16. At event 17, a message from the content provider application 230 is communicated to the content consumer application 210 announcing that the SMS application on the smartphone has been selected. Events 18 and 19 include text messages for display to announce that the SMS application has been started. At event 20, the content provider application 230 gets the currently running application, which may include binding to the service of the SMS application and registering the broadcast receiver of the SMS application. At event 21, an accept message is communicated to the content provider application 230, which is passed on to the SMS application 602 at event 23. At event 22, the SMS application 602 processes the commands.

At event 24, the last message received by the SMS application 602 is read out. The message may be read out using the text-to-speech engine132c(in FIG. 1). The message readout may be heard on Bluetooth® enabled headsets using the wireless A2DP forwarding feature. At event 25, the SMS application 602 has received a new message. At event 26, a new SMS message broadcast receiver is activated, which notifies the content consumer application 210 to update the display at the head unit 202 (FIG. 2) to display the new message received at event 27. At events 28 and 29, an "ACCEPT" command from the user is communicated from the content consumer application 210 to the content provider application 230, and then to the SMS application 602. The SMS application 602 then begins to readout the new message at event 30, which again may involve the TTS and audio playback of the SMS message. At event 31, the new message has been read out, and the context is restored to the old message. The content provider application 230 sends a message to the content consumer application 210 to update the display to the context of the old message at event 32.

At event 33, the user has indicated a desire to return to a browsing mode. The content consumer application 210 sends a "RESET" message to the content provider application 230. The content provider application 230 may then finish the currently running application at event 34. The displays are restored to browsing mode at events 35, 36, and 37.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIGS. 1-6. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for integrating a feature rich application platform operating on a mobile device and a vehicle infotainment system, the system comprising:
 a head unit configured to control access to a user input device in the vehicle infotainment system, the head unit having a processor and a communications interface; and
 a content consumer application operating under control of the processor in the head unit and configured to communicate user generated commands entered by a user via the user input device over the communications interface to a content provider application executing on the mobile device, wherein the content provider application is configured to:
  receive from the content consumer application a selection of a first sub-application included in a plurality of sub-applications available on the mobile device;
  launch the first sub-application for execution on the mobile device, wherein first sub-application starts a service that allows the first sub-application to receive commands from the content consumer application forwarded by the content provider application; and
  bind to the service started by the first sub-application to ensure that the commands received from the content consumer application reach the first sub-application.

2. The system of claim 1 where:
 the head unit further includes a user output device, and
 the content consumer application is configured to receive messages from the first sub-application over the communications interface, and to communicate the message to the user using the user output device.

3. The system of claim 1 where:
 the user output device includes a display having space sufficient to display at least one sub-application name; and
 the content consumer application is configured to receive a sub-application name associated with the first sub-application from the content provider application and to provide the sub-application name to the display to display the sub-application name as a currently selected sub-application.

4. The system of claim 1 where:
the user-generated commands include a first command where the mobile device launches the first sub-application for execution on the mobile device when the first command is communicated to the content provider application.

5. The system of claim 4 where:
the content consumer application is configured to receive messages generated by the first sub-application after the first sub-application is launched for execution on the mobile device, and the content consumer application is further configured to provide the messages to the display.

6. The system of claim 1 where:
the user-generated commands include a second command where a next sub-application name in a list of sub-application names is received at the content consumer application for display as the currently selected sub-application when the second command is communicated to the content provider application.

7. The system of claim 6 where:
the user-generated commands include a third command where a previous sub-application name in the list of sub-application names is received at the content consumer application for display as the currently selected sub-application when the third command is communicated to the content provider application.

8. The system of claim 1 where:
the head unit includes a second communications interface and an audio output device, where the second communications interface communicates streamed audio signals from the mobile device for output over the audio output device.

9. The system of claim 8 where the second communications interface includes a Bluetooth® Advanced Audio Distribution Profile ("A2DP").

10. The system of claim 1 where the communications interface includes a Bluetooth® Serial Port Profile ("SPP").

11. The mobile device of claim 1 where the mobile device is a smartphone.

12. The mobile device of claim 11 further comprising an Android® operating system.

13. The system of claim 1, wherein the content provider application is further configured to, in response to determining that a second sub-application included in the plurality of sub-applications has become the currently running sub-application, bind to a service corresponding to the second sub-application.

14. The system of claim 1, wherein the content provider application is further configured to register with a broadcast receiver of the first sub-application to ensure that messages from the first sub-application are delivered to the content consumer application.

15. A mobile device comprising:
a plurality of applications including at least one sub-application for executing on the mobile device under control of a head unit in a vehicle infotainment unit;
a communications interface for establishing a communications connection with the head unit; and
a content provider application configured to identify the applications available, and to establish a connection over the communications interface with a content consumer application on the head unit, the content provider application configured to:
receive from the content consumer application a selection of a first sub-application included in the plurality of applications;
launch the first sub-application for execution on the mobile device, wherein first sub-application starts a service that allows the first sub-application to receive commands from the content consumer application forwarded by the content provider application; and
bind to the service started by the first sub-application to ensure that the commands received from the content consumer application reach the first sub-application.

16. The mobile device of claim 15 where the content provider application is configured to receive a message from the first sub-application and to communicate the message to the content consumer application, the content consumer application being configured to communicate the message to a user output device on the head unit.

17. The mobile device of claim 15 where the content provider application provides a sub-application name of the first sub-application to the content consumer application over the communications interface, where user output device on the head unit is a display and the content consumer application displays the sub-application name as a currently selected sub-application.

18. The mobile device of claim 15 where the user generated command received by the content provider application includes a first command, the content provider application being configured to launch the first sub-application for execution on the mobile device when the content provider application receives the first command.

19. The mobile device of claim 18 where the content provider application is configured to receive messages generated by the first sub-application after the first sub-application is launched and to communicate the messages from the first sub-application to the content consumer application over the communications interface.

20. The mobile device of claim 15 where:
the user generated command received by the content provider application includes a second command;
the content provider application is configured to provide a next sub-application name in a list of sub-application names to the content consumer application on the head unit for display as the currently selected sub-application when the second command is received by the content provider application.

21. The mobile device of claim 20 where:
the user generated command received by the content provider application includes a third command,
the content provider application is configured to provide a previous sub-application name in a list of sub-application names to the content consumer application Page 5 on the head unit for display as the currently selected sub-application when the third command is received by the content provider application.

22. The mobile device of claim 15 further comprising:
a text to speech service configured to convert messages to be communicated to the head unit to streaming audio signals;
a second communications interface between the mobile device and the head unit, the content provider application being configured to communicate the streaming audio signals over the second communications interface for output by the head unit over an audio output device.

23. The mobile device of claim 22 where the second communications interface includes a Bluetooth® Advanced Audio Distribution Profile ("A2DP").

24. The mobile device of claim 15 where the communications interface includes a Bluetooth® Serial Port Profile ("SPP").

\* \* \* \* \*